(12) United States Patent
Buri et al.

(10) Patent No.: US 9,238,727 B2
(45) Date of Patent: Jan. 19, 2016

(54) TREATED MINERAL FILLER PRODUCTS, PROCESS FOR THE PREPARATION THEREOF AND USES OF SAME

(75) Inventors: Matthias Buri, Rothrist (CH); Patrick A. C. Gane, Rothrist (CH); Samuel Rentsch, Aarburg (CH); René Burkhalter, Herzogenbuchsee (CH)

(73) Assignee: Omya International AG, Oftringen (CH)

( * ) Notice: Subject to any disclaimer, the term of this patent is extended or adjusted under 35 U.S.C. 154(b) by 79 days.

(21) Appl. No.: 13/697,563

(22) PCT Filed: May 23, 2011

(86) PCT No.: PCT/EP2011/058372
§ 371 (c)(1),
(2), (4) Date: Jan. 8, 2013

(87) PCT Pub. No.: WO2011/147778
PCT Pub. Date: Dec. 1, 2011

(65) Prior Publication Data
US 2013/0217819 A1    Aug. 22, 2013

Related U.S. Application Data

(60) Provisional application No. 61/396,939, filed on Jun. 4, 2010.

(30) Foreign Application Priority Data

May 28, 2010    (EP) .................................... 10164409

(51) Int. Cl.
| | | |
|---|---|---|
| *C08K 9/04* | (2006.01) | |
| *C09C 1/02* | (2006.01) | |
| *C08K 5/09* | (2006.01) | |
| *C08K 3/26* | (2006.01) | |
| *C09C 3/08* | (2006.01) | |

(52) U.S. Cl.
CPC ... *C08K 5/09* (2013.01); *C08K 3/26* (2013.01); *C09C 1/021* (2013.01); *C09C 3/08* (2013.01); *C01P 2004/03* (2013.01); *C01P 2004/61* (2013.01); *C01P 2004/62* (2013.01); *C01P 2006/12* (2013.01); *C01P 2006/32* (2013.01); *C01P 2006/40* (2013.01); *C08K 9/04* (2013.01)

(58) Field of Classification Search
CPC ............. C09C 1/021; C08K 3/26; C08K 9/04
USPC ................... 523/200; 428/403, 405; 427/215; 106/465
See application file for complete search history.

(56) References Cited

U.S. PATENT DOCUMENTS

| | | |
|---|---|---|
| 4,407,986 A | 10/1983 | Nomura et al. |
| 4,520,073 A | 5/1985 | Randolph et al. |
| 2002/0102404 A1 | 8/2002 | Nakai et al. |

FOREIGN PATENT DOCUMENTS

| | | | |
|---|---|---|---|
| EP | 0153193 | A2 | 8/1985 |
| EP | 0325114 | A2 | 7/1989 |
| EP | 1980588 | A1 * | 10/2008 |
| GB | 2360034 | A | 12/2001 |
| JP | 54162746 | A | 12/1979 |
| WO | 9202587 | A1 | 2/1992 |
| WO | 9961521 | A1 | 12/1999 |
| WO | 0132787 | A1 | 5/2001 |
| WO | 03082966 | A1 | 10/2003 |
| WO | 2005075353 | A1 | 8/2005 |

OTHER PUBLICATIONS

Wypych, George. Handbook of Fillers, 2nd Edition. Toronto, ChemTec Publishing, 2000, p. 48. TP1114.W96.*

* cited by examiner

*Primary Examiner* — Vickey Nerangis
(74) *Attorney, Agent, or Firm* — Amster, Rothstein & Ebenstein LLP

(57) ABSTRACT

The present invention relates to the technical field of treated mineral filler products. The invention further relates to a process for preparing such treated mineral filler products, and to its preferred use in the field of plastic applications, and in particular polypropylene (PP)- or polyethylene (PE)-based breathable or extrusion coating film applications.

29 Claims, No Drawings

TREATED MINERAL FILLER PRODUCTS, PROCESS FOR THE PREPARATION THEREOF AND USES OF SAME

CROSS-REFERENCE TO RELATED APPLICATIONS

This application is a U.S. national phase of PCT Application No. PCT/EP2011/058372, filed May 23, 2011, which claims priority to European Application No. 10164409.4, filed May 28, 2010 and U.S. Provisional Application No. 61/396,939 filed Jun. 4, 2010.

The present invention relates to the technical field of treated mineral filler products. The invention further relates to a process for preparing such treated mineral filler products, and to its preferred use in the field of plastic applications, and in particular polypropylene (PP)- or polyethylene (PE)-based breathable or extrusion coating film applications.

Mineral fillers and especially calcium carbonate-containing mineral fillers are often used as particulate fillers in polymer products usually made of polyethylene (PE), polypropylene (PP), polyurethane (PU) and polyvinylchloride (PVC). However, calcium carbonate-containing mineral fillers are generally associated with the presence of volatiles evolving at temperatures reached during the application of such mineral fillers and/or in the processing of polymer products comprising such mineral fillers. Such volatiles may, for example, be:

- inherently associated with the mineral filler ("inherent volatiles"), and is especially associated water, and/or
- introduced during the treatment of the mineral filler ("added volatiles"), for example, to render the mineral filler more dispersible within a polymeric plastic medium, and/or
- generated by the reaction of inherent organic materials and/or added organic materials, with the mineral filler; such reactions may especially be induced or enhanced by temperatures reached during the introduction and/or processing of the polymeric material comprising the mineral filler, such as during the extrusion or compounding process; and/or
- generated by the degradation of inherent organic materials and/or added organic materials, forming $CO_2$, water and possibly low molecular mass fractions of these organic materials; such a degradation may especially be induced or enhanced by temperatures reached during the introduction and/or processing of the polymeric material comprising the mineral filler, such as during the extrusion or compounding process.

As a result of the presence of such volatiles, it may be difficult to prepare a polymer product free of voids leading to uneven surfaces and thus to a degradation of the quality of the final polymer product comprising such mineral filler. This is particularly a problem encountered in the preparation of PP- or PE-based breathable or extrusion coating films comprising a mineral filler and more particularly calcium carbonate-containing mineral fillers. Moreover, volatiles may lead to a reduction in the tensile and tear strength of such a film, and may degrade its visible aspects, in particular of its visible uniformity. Furthermore, volatiles can generate excessive foaming of the mineral filled polymer melt during a step of compounding, causing unwanted product build-up at the vacuum extraction and hence, forcing a reduced output rate.

In the art, several attempts have been made to improve the applicability of mineral fillers and especially calcium carbonate-containing mineral fillers, e.g. by treating such mineral fillers with higher aliphatic carboxylic acids and/or carboxylic acid salts having at least 10 carbon atoms such as palmitic acid and/or stearic acid, which in some cases may also be referred to as fatty acids. However, it is to be noted that higher carboxylic acids, namely carboxylic acids having at least 10 carbon atoms are solid at room temperature. Consequently, said higher carboxylic acids need to be stored liquid or transported at increased temperature to be easily handled and, moreover, said higher carboxylic acids need to be molten by an additional step of thermal treatment for their use as surface treatment agent. For instance, WO 00/20336 relates to an ultrafine natural calcium carbonate, which may optionally be treated with one or several fatty acids or one or several salts or mixtures thereof, and which is used as a rheology regulator for polymer compositions.

Likewise, U.S. Pat. No. 4,407,986 relates a precipitated calcium carbonate that is surface-treated with a dispersant that may include higher aliphatic acids and their metal salts in order to limit the addition of lubricant additives when kneading this calcium carbonate with crystalline polypropylene and to avoid the formation of calcium carbonate aggregates that limit the impact strength of the polypropylene.

In EP 0 325 114, relating to non-sagging underseal compositions for motor vehicles based on polyvinyl chloride which has improved rheological and adhesion properties, Example 7 discloses a mixture of an ammonium salt of 12-hydroxystearic acid in combination with a fatty acid (in a weight ratio of 1:1) used to treat a mineral filler.

WO 03/082966 relates to a cross-linkable and/or cross-linked nanofiller composition which, in optional embodiments, may additionally include fillers that may or may not be coated with stearic acid, stearate, silane, siloxane and/or titanate. Such nanofiller compositions are used to increase barrier properties, strength and heat distortion temperatures, making them useful in medical, automotive, electrical, construction and food application.

U.S. 2002/0102404 describes dispersible calcium carbonate particles coated on their surface with a combination of saturated and unsaturated aliphatic carboxylic acids and salts thereof along with an organic compound such as a phthalic ester, which are used in adhesive compositions to improve viscosity stability and adhesion properties.

Moreover, U.S. 2002/0102404 requires the implementation of a mixture of saturated and unsaturated aliphatic carboxylic acids/salts. The presence of unsaturated aliphatic carboxylic acids/salts increases the risk of unwanted in situ side reactions with the double bond during processing of any unsaturated aliphatic carboxylic acid/salt-comprising material. Additionally, the presence of unsaturated aliphatic carboxylic acids/salts may result in discoloration of, or unwanted odour development, and notably rancid odours, in the material in which they are implemented.

Claim 11 of WO 92/02587 indicates that a saponified sodium salt solution of at least one high molecular weight unsaturated fatty acid or combination of at least one high molecular weight unsaturated fatty acid and at least one high molecular weight unsaturated fatty acid, may be added to a pre-heated slurry of precipitated calcium carbonate, to ultimately produce a desired level of fatty acid coating on the calcium carbonate before proceeding with further process steps.

The abstract of JP54162746 discloses a composition comprising given relative amounts of rigid vinyl chloride resin, fatty acid treated-colloidal calcium carbonate, and barium stearate used in order to improve the heat stability of the vinyl chloride composition.

U.S. Pat. No. 4,520,073 describes mineral filler materials with improved hydrophobic coatings prepared by pressure coating of porous minerals using steam as a carrier for the coating material. Said coating material may be selected, among other options, from long chain aliphatic fatty acids and their salts.

WO 01/32787 describes a particulate alkaline earth metal carbonate material product which has on its particles a coating of hydrophobic material comprising a composition formed of (a) a first component which comprises the reaction product of the alkaline earth metal carbonate and at least one given aliphatic carboxylic acid and (b) a second component having a carbonate release temperature substantially higher than the first component comprises a compound of formula $CH_3(CH_2)_mCOOR$.

However, the prior art does rarely disclose treated mineral filler products which would solve the following multifaceted technical problems:

- to treat a mineral filler by using a surface treatment agent featuring a workable viscosity, that is to say a Brookfield viscosity of less than 1000 mPa.s at 23° C.;
- to treat a mineral filler such that the resulting treated mineral filler product features an increased volatile onset temperature that is significantly greater than that of a mineral filler product treated with carboxylic acids and/or carboxylic acid salts having at least 10 carbon atoms;
- to treat a mineral filler such that the resulting treated mineral filler product is sufficiently hydrophobic for applications in plastics requiring dispersability of the treated mineral filler product in the polymer medium, preferably such that said treated mineral filler product is more hydrophobic than if treated with carboxylic acids and/or carboxylic acid salts having at least 10 carbon atoms;
- to treat a mineral filler such that the resulting treated mineral filler product has a low moisture pick up susceptibility such that it is lower than that of a mineral filler product treated with carboxylic acids and/or carboxylic acid salts having at least 10 carbon atoms;
- to identify a surface treatment agent that achieves the above regardless of whether or not the at least one mineral filler undergoes a salt exchange on contact with the surface treatment agent to create corresponding calcium salts on the surface of the treated mineral filler.

In this regard, one obvious means to increase the volatile onset temperature associated with the mineral filler is to avoid or limit the use of certain common filler treatment additives. However, often, as in the case when a mineral filler is applied in a plastic application, such additives are needed to ensure other functions.

For example, in the case of breathable film applications, additives are introduced to provide the mineral filler with a hydrophobic coating and to improve the dispersability of the mineral filler in the film precursor material as well as possibly to improve the processability of this film precursor material and/or properties of the final application products. An elimination of such additives would unacceptably compromise the resulting film quality.

In this regard, additional prior art, namely WO 99/61521 and WO 2005/075353, which suggest a reduction of only the inherent water and picked up humidity of the starting mineral filler, entirely missed the point of reducing the other volatiles besides water which contribute to the total volatiles.

Thus, there is still a need for treated mineral filler products and in particular calcium carbonate-containing mineral fillers which address the foregoing technical problems described and especially a treated mineral filler product having improved surface characteristics.

Accordingly, it is an objective of the present invention to provide a treated mineral filler product having improved surface characteristics, and especially a high volatile onset temperature. Even a further objective is to provide a treated mineral filler product featuring a sufficient hydrophobicity for plastic applications. A still further objective is to provide a treated mineral filler product featuring a low moisture pick up susceptibility. Another objective of the present invention is to provide a treated mineral filler product prepared by using a surface treatment agent which can be easily handled. A further objective is to provide a treated mineral filler product prepared by a process that can be carried out under cost-efficient and mild conditions, i.e. by avoiding an intensive thermal treatment of used educts. Further objectives can be gathered from the following description of the invention.

The foregoing and other objectives are solved by the subject-matter as defined herein in claim 1.

Advantageous embodiments of the inventive treated mineral filler product are defined in the corresponding sub-claims.

According to one aspect of the present application a treated mineral filler product providing a volatile onset temperature of at least 250° C. has been developed, the treated mineral filler product comprising:

a) at least one calcium carbonate-containing mineral filler;
b) a treatment layer located on the surface of said at least one calcium carbonate-containing mineral filler, said treatment layer essentially consisting of:
   at least one saturated aliphatic carboxylic acid having from 6 to 9 carbon atoms and/or
   reaction products of said at least one saturated aliphatic carboxylic acid on the surface of said at least one mineral filler.

The inventors surprisingly found that the foregoing treated mineral filler product according to the present invention provides a high volatile onset temperature of at least 250° C., a sufficient hydrophobicity and low moisture pick up susceptibility. More precisely, the inventors found that the surface characteristics of a treated mineral filler product can be improved by the addition of defined saturated aliphatic carboxylic acids.

It should be understood that for the purposes of the present invention, the following terms have the following meanings:

The term "mineral filler" in the meaning of the present invention refers to substances of mineral origin added to materials such as paper, plastics, rubber, paints and adhesives, etc. to lower the consumption of more expensive materials such as binders, or to enhance technical properties of the products. The person skilled in the art very well knows the typical fillers used in the respective fields.

The term "saturated" in the meaning of the present invention means having an iodine number of less than 5 g $I_2$/100 g sample. This iodine number determination is well-known to the skilled man, and namely implements a determination of the iodine addition to a 100 g sample by back-titration of the surplus iodine with sodium thiosulfate.

The term "aliphatic carboxylic acid" in the meaning of the present invention refers to straight chain, branched chain, or alicyclic organic compounds composed of carbon and hydrogen. Said organic compound further contains a carboxyl group placed at the end of the carbon skeleton.

The term "treatment layer essentially consisting of" in the meaning of the present invention refers to a treatment layer that consists of at least 95 wt.-% and most preferably of at least 99 wt.-%, based on the total weight of the surface layer, of the at least one saturated aliphatic carboxylic acid having from 6 to 9 carbon atoms and/or reaction products thereof. Furthermore, it is preferred that the general term "treatment layer" in the meaning of the present invention refers to a treatment layer that does not comprise higher carboxylic acids, namely carboxylic acids having at least 10 carbon atoms.

The term "reaction products" in the meaning of the present invention refers to products typically obtained by contacting a mineral filler with a surface treatment agent. Said reaction products are preferably formed between the applied surface treatment agent and molecule located at the surface of the mineral filler.

The term "theoretical total weight" in the meaning of the present invention relates to the amount of treatment agent that would be present in the treatment layer if all of said treatment agent is completely deposited in the treatment layer.

The term "molecules/m$^2$" or "number of molecules/m$^2$" in the meaning of the present invention is evaluated by determining the amount of the respective treatment agent (in mol) added for contacting the at least one calcium carbonate-containing mineral filler and by calculating the theoretical number of molecules of said amount by using the Avogadro constant ($6.02214179 \times 10^{23}$/mol).

The term "volatile onset temperature" in the meaning of the present application refers to a temperature at which volatiles—including volatiles introduced as a result of common mineral filler preparation steps including grinding, with or without grinding aid agents, benefaction, with or without flotation aid or other agents, and other pre-treatment agents not expressly listed above, detected according to the thermogravimetric analysis described hereafter—begin to evolve, as observed on a thermogravimetric (TGA) curve, plotting the mass of remaining sample (y-axis) as a function of temperature (x-axis), the preparation and interpretation of such a curve being defined hereafter.

TGA analytical methods provide information regarding losses of mass and volatile onset temperatures with great accuracy, and is common knowledge; it is, for example, described in "Principles of Instrumental analysis", fifth edition, Skoog, Holler, Nieman, 1998 (first edition 1992) in Chapter 31 pages 798 to 800, and in many other commonly known reference works. In the present invention, thermogravimetric analysis (TGA) is performed using a Mettler Toledo TGA 851 based on a sample of 500+/−50 mg and scanning temperatures from 25 to 350° C. at a rate of 20° C./minute under an air flow of 70 ml/min.

The skilled man will be able to determine the "volatile onset temperature" by analysis of the TGA curve as follows: the first derivative of the TGA curve is obtained and the inflection points thereon between 150 and 350° C. are identified. Of the inflection points having a tangential slope value of greater than 45° relative to a horizontal line, the one having the lowest associated temperature above 200° C. is identified. The temperature value associated with this lowest temperature inflection point of the first derivative curve is the "volatile onset temperature".

A "molten" or "liquid" state in the meaning of the present invention is defined as the state in which a material is entirely liquid, in other words is entirely melted. Whereas the phenomenon of melting occurs at constant temperature on application of energy, a substance is qualified as being molten as of the moment following melting when the temperature begins to rise, as observed on a curve plotting temperature versus energy input obtained by Dynamic Scanning Calorimetry, DSC, (DIN 51005: 1983-11).

The term "specific surface area" (in m$^2$/g) of the mineral filler in the meaning of the present invention is determined using the BET method, which is well known to the skilled man (ISO 9277:1995). The total surface area (in m$^2$) of the mineral filler is then obtained by multiplication of the specific surface area and the mass (in g) of the mineral filler prior to treatment.

The term "dry" mineral filler is understood to be a mineral filler having less than 0.3% by weight of water relative to the mineral filler weight. The % water is determined according to the Coulometric Karl Fischer measurement method, wherein the mineral filler is heated to 220° C., and the water content released as vapour and isolated using a stream of nitrogen gas (at 100 ml/min) is determined in a Coulometric Karl Fischer unit.

The term "moisture pick up susceptibility" in the meaning of the present invention refers to the amount of moisture absorbed on the surface of the mineral filler and is determined in mg moisture/g of the dry treated mineral filler product after exposure to an atmosphere of 50% of relative humidity for 48 hours at a temperature of 23° C.

The "hydrophobicity" of a mineral filler product is evaluated by determining the minimum methanol to water ratio in a methanol-water mixture needed for the settling of a majority of said mineral filler product, where said mineral filler product is deposited on the surface of said methanol-water mixture by passage through a house hold tea sieve.

As used herein and as generally defined in the art, the "$d_{50}$" value is determined based on measurements made by using a Sedigraph™ 5100 of Micromeritics Instrument Corporation and is defined as the size at which 50% (the median point) of the particle volume or mass is accounted for by particles having a diameter equal to the specified value. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

The Brookfield viscosity as used herein and as generally defined in the art is measured by using a DV III Ultra model Brookfield viscometer equipped with the disc spindle 3 at a rotation speed of 100 rpm and room temperature (23±1° C.) after stirring for one minute.

The quantification and qualification of the at least one carboxylic acid as used herein is carried out by using a Perkin Elmer gas chromatograph equipped with FID detector, Integrator software and the capillary column Optima delta-6 (Marcherey Nagel) of dimensions 60 m×0.32 mm ID (0.5 mm OD) and 0.35 μm film thickness. Measurements are carried out at a detector temperature of about 310° C., an injector port temperature of about 310° C. and an isothermal oven temperature of about 240° C. for a period of about 35 min. For analyzing calcium carbonate materials, 2.5 Mol HCl/Mol of said material is added to the calcium carbonate material under reflux and heated at 60-80° C. until the material is completely dissolved. Subsequently, the solution is allowed to cool down below 30° C. and then extracted with ethylether under reflux. The organic phase is separated, concentrated and an amount of approximately 20 mg of the obtained residue (±2 mg) is placed into a closable vessel and dissolved in 0.5 ml pyridine. Subsequently, 0.5 ml phenyltrimethylammoniumhydroxide (p.A., 0.2 M in methanol, Supelco 33097-U) is added, the vessel closed and the reagents mixed by shaking. 1.0 μl of the prepared sample are injected into the GC by using a 5.0 μl syringe and the single peaks are identified and quantified on the basis of an external calibration with the pure carboxylic acids.

According to another aspect of the present invention, a process for preparing the treated mineral filler product is provided, characterised in that said process comprises the steps of:

(a) providing at least one calcium carbonate-containing mineral filler;
(b) providing at least one saturated aliphatic carboxylic acid having between 6 and 9 carbon atoms;
(c) contacting said at least one calcium carbonate-containing mineral filler of step (a), in one or more steps, with the at least one saturated aliphatic carboxylic acid of step (b) such that the added amount of said at least one saturated aliphatic carboxylic acid corresponds to a theoretical total number of molecules of between $1\times10^{18}$ and $1\times10^{20}/m^2$ on the surface of the treated mineral filler product; and
(d) forming a treatment layer comprising said at least one saturated aliphatic carboxylic acid and/or reaction products of said at least one saturated aliphatic carboxylic acid on the surface of said at least one mineral filler resulting in a treated mineral filler product.

According to another aspect of the present invention, a treated mineral filler product is provided, wherein said mineral filler is obtainable by the inventive process for preparing a treated mineral filler product. According to another aspect, the present invention refers to the use of said treated mineral filler product in a process of mixing and/or extruding and/or compounding and/or blow moulding with plastic materials, in particular with plastic materials comprising polyolefins or thermoplastics such as polyethylenes (PE), polypropylenes (PP), polyurethanes (PU) and/or polyvinylchlorides (PVC). According to another aspect, the present invention refers to films, and in particular films selected from the group comprising stretched and/or oriented films, and preferably breathable films, or extrusion coating films, comprising the treated mineral filler product.

According to one preferred embodiment of the present invention, the at least one calcium carbonate-containing mineral filler is precipitated calcium carbonate (PCC), namely one or more of the aragonitic, vateritic and calcitic mineralogical crystal forms, and/or natural ground calcium carbonate (GCC), namely one or more of marble, limestone, or chalk, and/or dolomite and preferably is marble and/or dolomite.

According to another preferred embodiment of the present invention, the at least one saturated aliphatic carboxylic acid is selected from the group consisting of hexanoic acid, heptanoic acid, octanoic acid, nonanoic acid and isononanoic acid, more preferably from octanoic acid and/or nonanoic acid.

According to yet another preferred embodiment of the present invention, the at least one calcium carbonate-containing mineral filler has a median particle size diameter $d_{50}$ in the range between 0.3 µm and 10 µm, preferably between 0.5 µm and 5 µm, more preferably between 1 µm and 3 µm and most preferably between 1.5 µm and 1.8 µm and/or a specific surface area (BET) of between 1 $m^2/g$ and 10 $m^2/g$ and more preferably of between 3 $m^2/g$ and 8 $m^2/g$ as measured by the BET nitrogen method.

According to one preferred embodiment of the present invention, the treated mineral filler product features a volatile onset temperature of greater than or equal to 260° C., preferably of greater than or equal to 270° C. and more preferably of between 270° C. and 350° C.

According to another preferred embodiment of the present invention, the treated mineral filler product has a higher volatile onset temperature than the same mineral filler having a treatment layer but wherein the at least one saturated aliphatic carboxylic acid is replaced with an aliphatic carboxylic acid and/or aliphatic carboxylic acid salt having 10 to 24 carbon atoms.

According to yet another preferred embodiment of the present invention, the moisture pick up susceptibility of the treated mineral filler product is such that its total surface moisture level is below 1.0 mg/g, more preferably below 0.5 mg/g and most preferably below 0.4 mg/g of dry treated mineral filler product after exposure to an atmosphere of 50% of relative humidity for 48 hours at a temperature of 23° C.

According to another preferred embodiment of the present invention, one or more treatment layers are located on the carboxylic acid treatment layer essentially consisting of at least one saturated aliphatic carboxylic acid having from 6 to 9 carbon atoms and/or reaction products of said at least one saturated aliphatic carboxylic acid.

According to another preferred embodiment of the present invention, at least one of said treatment layers located on the carboxylic acid treatment layer comprises at least one polysiloxane, preferably selected from polydimethylsiloxane.

According to one preferred embodiment of the inventive process, the at least one calcium carbonate-containing mineral filler of step (a) is contacted with the at least one saturated aliphatic carboxylic acid of step (b) such that the added amount of said at least one saturated aliphatic carboxylic acid corresponds to a theoretical total number of molecules of between $5\times10^{18}$ and $5\times10^{19}/m^2$ on the surface of the treated mineral filler product.

According to another preferred embodiment of the inventive process, the at least one saturated aliphatic carboxylic acid of step (b) features an equivalent isolated viscosity of less than 500 mPa.s at 23° C. when measured in a DV III Ultra model Brookfield viscometer equipped with the disc spindle 3 at a rotation speed of 100 rpm and room temperature (23±1° C.).

According to yet another preferred embodiment of the inventive process, the treatment layer of step (d) essentially consists of said at least one saturated aliphatic carboxylic acid and/or reaction products of said at least one saturated aliphatic carboxylic acid on the surface of said at least one mineral filler resulting in a treated mineral filler product.

According to one preferred embodiment of the inventive process, one or more treatment layers are additionally formed on the carboxylic acid treatment layer of step (d).

As set out above, the inventive treated mineral filler product having improved surface characteristics comprises at least one calcium carbonate-containing mineral filler and a treatment layer as set out in points (a) and (b). In the following, it is referred to further details of the present invention and especially the foregoing points of the inventive treated mineral filler product.

Characterization of (a): the at least one calcium carbonate-containing mineral filler According to point (a) of the present invention, the treated mineral filler product comprises at least one calcium carbonate-containing mineral filler.

A calcium carbonate-containing mineral filler in the meaning of the present invention refers to a calcium carbonate material selected from ground (or natural) calcium carbonate (GCC) or a precipitated calcium carbonate (PCC) or a mixture of GCC and PCC, optionally co-ground.

GCC is understood to be a naturally occurring form of calcium carbonate, mined from sedimentary rocks such as limestone or chalk, or from metamorphic marble rocks and processed through a treatment such as grinding, screening and/or fractionizing in wet and/or dry form, for example by a cyclone or classifier. Preferably, the GCC is selected from the group comprising marble, chalk, dolomite, limestone and mixtures thereof.

By contrast, calcium carbonate of the PCC type include synthetic calcium carbonate products obtained by carbonation of a slurry of calcium hydroxide, commonly referred to in the art as a slurry of lime or milk of lime when derived from finely divided calcium oxide particles in water or by precipitation out of an ionic salt solution. PCC may be rhombohedral and/or scalenohedral and/or aragonitic; preferred synthetic calcium carbonate or precipitated calcium carbonate comprising aragonitic, vateritic or calcitic mineralogical crystal forms or mixtures thereof.

In one preferred embodiment, the at least one calcium carbonate-containing mineral filler is marble.

The at least one calcium carbonate-containing mineral filler is preferably in the form of a particulate material, and may have a particle size distribution as conventionally employed for the material(s) involved in the type of product to be produced. In general, the median particle size diameter $d_{50}$ value of the at least one calcium carbonate containing-mineral filler is in the range between 0.3 µm and 10 µm, preferably between 0.5 µm and 5 µm, more preferably between 1 µm and 3 µm and mot preferably between 1.5 µm and 1.8 µm. A mineral filler $d_{98}$ of less than 25 microns, preferably of less than 10 microns may also be advantageous.

Additionally or alternatively, the at least one calcium carbonate-containing mineral filler provided in step (a) exhibits a BET specific surface area of from 1 $m^2/g$ to 10 $m^2/g$ and more preferably from 3 $m^2/g$ to 8 $m^2/g$, measured using nitrogen and the BET method according to ISO 9277.

In case the at least one calcium carbonate-containing mineral filler provided in step (a) is selected from GCC, the BET specific surface area is preferably of between 1 $m^2/g$ and 10 $m^2/g$, more preferably of between 3 $m^2/g$ and 8 $m^2/g$ and most preferably of between 3.5 $m^2/g$ and 4.5 $m^2/g$ as measured by the BET nitrogen method.

For example, if a marble is used as the at least one calcium carbonate-containing mineral filler provided in step (a), the median particle size diameter $d_{50}$ value is preferably in the range between 1 µm and 3 µm, more preferably between 1.1 µm and 2.5 µm, even more preferably between 1.2 µm and 2 µm and most preferably between 1.5 µm and 1.8 µm. In this case, the marble preferably exhibits a BET specific surface area of from 3 $m^2/g$ to 6 $m^2/g$, more preferably from 3.5 $m^2/g$ to 5.5 $m^2/g$ and most preferably from 3.5 $m^2/g$ to 4.5 $m^2/g$, measured using nitrogen and the BET method according to ISO 9277.

By contrast, if a PCC is used as the at least one calcium carbonate-containing mineral filler provided in step (a), the BET specific surface area is preferably in the range of from 1 $m^2/g$ to 10 $m^2/g$, more preferably of from 3 $m^2/g$ to 8 $m^2/g$, even more preferably of from 6 $m^2/g$ to 7.5 $m^2/g$ and most preferably of from 6.5 $m^2/g$ to 7.5 $m^2/g$, measured using nitrogen and the BET method according to ISO 9277.

The at least one calcium carbonate-containing mineral filler is a dry ground material, a material being wet ground and dried or a mixture of the foregoing materials. In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill an attrition mill, a pin mill, a hammer mill, a pulveriser, a shredder, a de-clumper, a knife cutter, or other such equipment known to the skilled man.

In case the treated mineral filler product comprises a wet ground calcium carbonate-containing mineral filler, the grinding step may be performed under conditions such that autogenous grinding takes place and/or by horizontal ball milling, and/or other such processes known to the skilled man. The wet processed ground calcium carbonate-containing mineral filler thus obtained may be washed and dewatered by well known processes, e.g. by flocculation, filtration or forced evaporation prior to drying. The subsequent step of drying may be carried out in a single step such as spray drying, or in at least two steps, e.g. by applying a first heating step to the mineral filler in order to reduce the associated moisture content to a level which is not greater than about 0.5 wt.-% based on the dry weight of the mineral filler, and applying a second heating step to the calcium carbonate in order to reduce the remaining moisture content to a level which is about 0.15 wt.-% or less, based on the dry weight of the mineral filler. In case said drying is carried out by more than one drying steps, the first step may be carried out by heating in a hot current of air, while the second and further drying steps are preferably carried out by an indirect heating in which the atmosphere in the corresponding vessel comprises a surface treatment agent. It is also common that such a mineral filler undergoes a beneficiation step (such as a flotation, bleaching or magnetic separation step) to remove impurities.

In one preferred embodiment, the calcium carbonate-containing mineral filler is a dry ground mineral filler. In another preferred embodiment, the at least one calcium carbonate-containing mineral filler is a material being wet ground in a horizontal ball mill, and subsequently dried by using the well known process of spray drying. In still another preferred embodiment, the at least one calcium carbonate-containing mineral filler is a material produced by dry grinding followed by aqueous low solids wet grinding at 10 wt.-% to 30 wt.-% solid material content, thermal or mechanical concentration to 40 wt.-% to 60 wt.-% solid material content and subsequent drying.

The grinding of the at least one calcium carbonate-containing mineral filler is preferably carried out in absence of a dispersing agent.

Depending on the at least one calcium carbonate-containing mineral filler used for preparing the treated mineral filler product, the total surface moisture content of the at least one calcium carbonate-containing mineral filler is preferably less than 1.0 wt.-% based on the dry weight of the calcium carbonate-containing mineral filler, even after exposure for 48 hours at 23° C. to a moisture atmosphere having a relative humidity of 50%.

In one preferred embodiment, the at least one calcium carbonate-containing mineral filler has a total surface moisture content of between 0.01 wt.-% and 1.0 wt.-%, preferably between 0.02 wt.-% and 0.9 wt.-% and more preferably between 0.04 wt.-% and 0.2 wt.-% based on the dry weight of the calcium carbonate-containing mineral filler, even after exposure for 48 hours at 23° C. to a moisture atmosphere having a relative humidity of 50%.

For example, in case GCC is used as the at least one calcium carbonate-containing mineral filler, the total surface moisture content of the at least one calcium carbonate-containing mineral filler is preferably of between 0.01 wt.-% and 1.0 wt.-%, more preferably between 0.02 wt.-% and 0.15 wt.-% and most preferably between 0.04 and 0.07 wt.-% based on the dry weight of the calcium carbonate-containing mineral filler, even after exposure for 48 hours at 23° C. to a moisture atmosphere having a relative humidity of 50%. In this case, said GCC may be for example selected from wet ground and spray dried marble.

If a PCC is used as the at least one calcium carbonate-containing mineral filler, the total surface moisture content of the at least one calcium carbonate-containing mineral filler is preferably of between 0.01 wt.-% and 1.0 wt.-%, more preferably between 0.1 wt.-% and 0.9 wt.-% and most preferably between 0.4 wt.-% and 0.7 wt.-% based on the dry weight of the calcium carbonate-containing mineral filler, even after exposure for 48 hours at 23° C. to a moisture atmosphere having a relative humidity of 50%.

Characterization of (b): the treatment layer located on the surface of the mineral filler In accordance with point (b) of the present invention, the treated mineral filler product comprises a treatment layer located on the surface of the at least one calcium carbonate-containing mineral filler essentially consisting of at least one saturated aliphatic carboxylic acid having between 6 and 9 carbon atoms and/or reaction products of said at least one saturated aliphatic carboxylic acid on the surface of said at least one mineral filler.

In this regard, the at least one saturated aliphatic carboxylic acid represents a surface treatment agent and may be selected from any linear or branched, substituted or non-substituted saturated carboxylic acid. Preferably, the at least one saturated aliphatic carboxylic acid is chosen from aliphatic monocarboxylic acids. Alternatively or additionally, the at least one saturated aliphatic carboxylic acid is chosen from branched aliphatic monocarboxylic acids.

For example, the at least one carboxylic acid is preferably chosen such that the number of carbon atoms is greater than or equal to 6 and most preferably greater than or equal to 8. Furthermore, said carboxylic acid has generally a number of carbon atoms that is lower or equal to 9.

In one preferred embodiment, the number of carbon atoms of the saturated aliphatic carboxylic acid is between 6 and 9 and most preferably 8 or 9. In another preferred embodiment, the number of carbon atoms of the saturated aliphatic carboxylic acid is 6 or 7.

In the first instance, the saturated aliphatic carboxylic acid is selected from the group consisting of hexanoic acid, heptanoic acid, octanoic acid, nonanoic acid, isononanoic acid and mixtures thereof. In one preferred embodiment, the saturated aliphatic carboxylic acid is selected from octanoic acid, nonanoic acid, isononanoic acid and mixtures thereof. In another preferred embodiment, the saturated aliphatic carboxylic acid is octanoic acid. In a further preferred embodiment, the saturated aliphatic carboxylic acid is hexanoic acid and/or heptanoic acid.

In case more than one saturated aliphatic carboxylic acids are used for preparing the treatment layer on the surface of the treated mineral filler product, the mixture of e.g. two saturated aliphatic carboxylic acids preferably comprises octanoic acid and nonanoic acid, or nonanoic acid and isononanoic acid or octanoic acid and isononanoic acid. In one preferred embodiment, a mixture of two saturated aliphatic carboxylic acids comprises octanoic acid and nonanoic acid.

If the treatment layer of the treated mineral filler product comprises a mixture of two saturated aliphatic carboxylic acids, e.g. octanoic acid and nonanoic acid according to the present invention, the weight ratio of octanoic acid and nonanoic acid is from 70:30 to 30:70 and more preferably from 60:40 to 40:60. In one especially preferred embodiment of the present invention, the weight ratio of octanoic acid and nonanoic acid is about 1:1.

Additionally or alternatively, it is to be noted that the at least one saturated aliphatic carboxylic acid of the present invention is a liquid at room temperature, i.e. said at least one saturated aliphatic carboxylic acid features a viscosity of less than 500 mPa·s at 23° C. when measured in a DV III Ultra model Brookfield viscometer equipped with the disc spindle 3 at a rotation speed of 100 rpm and room temperature (23±1° C.).

It is further to be noted that the preparation of the treatment layer does preferably not comprise the additional provision of one or more cation salts of one or more saturated aliphatic carboxylic acids having between 6 and 9 carbon atoms wherein the cation is selected from among calcium, magnesium, strontium, aluminium and mixtures thereof.

In a preferred embodiment, the treatment layer of the treated mineral filler product may further comprise additional surface treatment agents that do not correspond to the at least one saturated aliphatic carboxylic acid and/or reaction products of the at least one saturated aliphatic carboxylic acid of the present invention. In such a case, it is preferred that this additional treatment agent is at least one polysiloxane, and more preferably a polydimethylsiloxane (PDMS).

In another preferred embodiment, the treated mineral filler product comprises additional treatment layers. In this case, said one or more additional treatment layers are located on the carboxylic acid treatment layer essentially consisting of the at least one saturated aliphatic carboxylic acid having from 6 to 9 carbon atoms and/or reaction products of said at least one saturated aliphatic carboxylic acid.

Preferably, at least one of said treatment layers located on the carboxylic acid treatment layer comprises additional surface treatment agents that do not correspond to the at least one saturated aliphatic carboxylic acid and/or reaction products of the at least one saturated aliphatic carboxylic acid of the present invention. In such a case, it is preferred that said at least one treatment layer located on said carboxylic acid treatment layer comprises at least one polysiloxane, preferably selected from polydimethylsiloxane.

The treated mineral filler product according to the present invention has improved surface characteristics in comparison to mineral fillers treated with carboxylic acids and/or carboxylic acid salts having at least 10 carbon atoms, i.e. without the implementation of the at least one saturated aliphatic carboxylic acid having from 6 to 9 carbon atoms. The inventive treated mineral filler product provides a volatile onset temperature that is higher than that obtained for mineral filler products treated with carboxylic acids and/or carboxylic acid salts having at least 10 carbon atoms. Additionally, the inventive treated mineral filler product provides a moisture pick up susceptibility that is lower than that obtained for mineral fillers treated with carboxylic acids and/or carboxylic acid salts having at least 10 carbon atoms. Furthermore, the inventive treated mineral filler product provides a sufficient hydrophobicity for plastic applications. Said volatile onset temperature, and other surface characteristics relating to the present invention are determined in accordance with the measurement method defined above and shown in the example section here below.

In a preferred embodiment, the treated mineral filler product of the present invention features a volatile onset temperature of at least 250° C. In another preferred embodiment, the treated mineral filler product of the present invention features a volatile onset temperature of greater than or equal to 260° C., and preferably of greater than or equal to 270° C. and most preferably of between 270° C. and 350° C. Moreover, the treated mineral filler product has preferably a higher volatile onset temperature than the same mineral filler having a treatment layer but wherein the at least one saturated aliphatic carboxylic acid having from 6 to 9 carbon atoms is replaced with carboxylic acids and/or carboxylic acid salts having at least 10 carbon atoms.

Furthermore, the treated mineral filler products of the present invention provide a low moisture pick up susceptibility. It is preferred that the moisture pick up susceptibility of the treated mineral filler product is such that its total surface moisture level is below 1.0 mg/g, more preferably below 0.5 mg/g and most preferably below 0.4 mg/g of the dry treated mineral filler product, after exposure to an atmosphere of 50% of relative humidity for 48 hours at a temperature of about 23° C. Moreover, the moisture pick up susceptibility of the treated mineral filler product is preferably lower than the same mineral filler having a treatment layer but wherein the at least one saturated aliphatic carboxylic acid having from 6 to 9 carbon atoms is replaced with carboxylic acids and/or carboxylic acid salts having at least 10 carbon atoms.

In another preferred embodiment, the inventive treated mineral filler product has a moisture content of between 0.01 wt.-% and 0.15 wt.-%, preferably between 0.02 wt.-% and 0.1 wt.-%, more preferably between 0.03 wt.-% and 0.08 wt.-% and most preferably between 0.03 wt.-% and 0.06 wt.-% based on the dry weight of the treated mineral filler product.

The treatment mineral filler product of the present invention can be prepared by conventional methods.

In accordance with the invention, the process for preparing the treated mineral filler product comprises a step of providing at least one calcium carbonate-containing mineral filler. Another step of the present process comprises the provision of at least one saturated aliphatic carboxylic acid having between 6 and 9 carbon atoms. A further step of the inventive process comprises contacting said at least one calcium carbonate-containing mineral filler, in one or more steps, with the at least one saturated aliphatic carboxylic acid, such that the added amount of said at least one saturated aliphatic carboxylic acid corresponds to a theoretical total number of molecules of between $1\times10^{18}$ and $1\times10^{20}/m^2$ on the surface of the treated mineral filler product. The process of the present invention further comprises forming of a treatment layer comprising said at least one saturated aliphatic carboxylic acid and/or reaction products of said at least one saturated aliphatic carboxylic acid on the surface of said at least one mineral filler resulting in a treated mineral filler product.

In one preferred embodiment, the at least one saturated aliphatic carboxylic acid having between 6 and 9 carbon atoms is added such that the added amount of said at least one saturated aliphatic carboxylic acid corresponds to a theoretical total number of molecules of between $5\times10^{18}$ and $5\times10^{19}/m^2$ on the surface of the treated mineral filler product.

Additionally or alternatively, the at least one saturated aliphatic carboxylic acid having between 6 and 9 carbon atoms is added such that the added amount of said at least one saturated aliphatic carboxylic acid corresponds to a theoretical total weight of between 0.25 and 5 mg/m² on the surface of the treated mineral filler product. For example, the at least one saturated aliphatic carboxylic acid of the present invention is added such that the added amount of said at least one saturated aliphatic carboxylic acid is less than 5 mg, more preferably less than 4.5 mg and most preferably less than 4.0 mg/m² on the surface of the treated mineral filler product.

In one preferred embodiment, the treatment layer of step (d) essentially consists of said at least one saturated aliphatic carboxylic acid and/or reaction products of said at least one saturated aliphatic carboxylic acid on the surface of said at least one mineral filler resulting in a treated mineral filler product.

The step of contacting the at least one calcium carbonate-containing mineral filler with the at least one saturated aliphatic carboxylic acid having between 6 and 9 carbon atoms preferably takes place under mixing conditions. The skilled man will adapt these mixing conditions (such as the configuration of mixing pallets and mixing speed) according to his process equipment.

In one preferred embodiment, the inventive process may be a continuous process. In this case, it is possible to contact the at least one calcium carbonate-containing mineral filler with the at least one saturated aliphatic carboxylic acid in a constant flow, so that a constant concentration of the carboxylic acid is provided during the step of contacting. In another preferred embodiment, the inventive process may be a batch process, i.e. the at least one calcium carbonate-containing mineral filler is contacted with the at least one saturated aliphatic carboxylic acid in more than one steps, wherein said saturated aliphatic carboxylic aid is preferably added in about equal portions. Alternatively, it is also possible to add the saturated aliphatic carboxylic acid in unequal portions to the at least one calcium carbonate-containing mineral filler, i.e. in larger and smaller portions.

When implementing the at least one carboxylic acid having between 6 and 9 carbon atoms, it features a workable viscosity at about room temperature, i.e. the at least one saturated aliphatic carboxylic acid is in a liquid or molten state. Preferably said at least one saturated aliphatic carboxylic acid features a viscosity of less than 500 mPa.s at 23° C. when measured in a DV III Ultra model Brookfield viscometer equipped with the disc spindle 3 at a rotation speed of 100 rpm and room temperature (23±1° C.).

In one preferred embodiment, the treatment temperature during the contacting of the at least one calcium carbonate-containing mineral filler with the at least one saturated aliphatic carboxylic acid having between 6 and 9 carbon atoms is preferably adjusted such that the at least one saturated aliphatic carboxylic acid is molten or in a liquid state. Therefore, the contacting of the at least one calcium carbonate-containing mineral filler with the at least one saturated aliphatic carboxylic acid may be carried out at lower treatment temperatures than that used in processes implementing carboxylic acid and/or carboxylic acid salts having at least 10 carbon atoms. In a preferred embodiment, the contacting of the at least one calcium carbonate-containing mineral filler with the at least one saturated aliphatic carboxylic acid is carried out at treatment temperatures of below 150° C. and most preferably of below 130° C. In another preferred embodiment, the contacting of the at least one mineral filler with the at least one saturated aliphatic carboxylic acid is carried out at temperatures of between 15 and 150° C., more preferably of between 15 and 130° C., e.g. of about 80° C. or about 120° C., even more preferably of between 90 and 115° C. and most preferably of between 90 and 105° C., or about 100° C. or about 120° C.

In another preferred embodiment, the contacting of the at least one calcium carbonate-containing mineral filler with the at least one saturated aliphatic carboxylic acid is carried out at about room temperature, more preferably at temperatures of between 15° C. and 30° C. and more preferably of temperatures of between 15° C. and 25° C., e.g. of about 20° C.

The treatment time for carrying out the contacting of the at least one calcium carbonate-containing mineral filler with the at least one saturated aliphatic carboxylic acid is carried out for a period of 30 min or less, preferably for a period of 20 min or less and more preferably for a period of 15 min or less. In general, the length of contacting the at least one calcium carbonate-containing mineral filler with the at least one saturated aliphatic carboxylic acid is determined by the treatment temperature applied during said contacting. For example, where a treatment temperature of about 100° C. is applied, the treatment time is as short as, for example, about 5 minutes. If a treatment temperature of about 20° C. is applied, the treatment time can be as long as, for example, about 15 minutes. In case the inventive process is carried out as a continuous process, the treatment time is preferably less than 60 sec, more preferably less than 10 sec and most preferably less than 5 sec.

In case, the treatment layer of the treated mineral filler product further comprises at least one polysiloxane. In such a case, such contacting of the at least one calcium carbonate-containing mineral filler with the at least one polysiloxane may be carried out during or after the contacting of the at least one calcium carbonate-containing mineral filler with the at least one saturated aliphatic carboxylic acid of the present invention.

In case, the treated mineral filler product further comprises one or more treatment layers located on the carboxylic acid treatment layer essentially consisting of at least one saturated aliphatic carboxylic acid having from 6 to 9 carbon atoms and/or reaction products of said at least one saturated aliphatic carboxylic acid, said additional one or more treatment layers are preferably formed on the carboxylic acid treatment layer of step (d).

If the treated mineral filler product further comprises said one or more additional treatment layers on the carboxylic acid treatment layer, at least one of said treatment layers preferably comprises at least one polysiloxane. In such a case, such contacting of the at least one calcium carbonate-containing mineral filler with the at least one polysiloxane is carried out after the contacting of the at least one calcium carbonate-containing mineral filler with the at least one saturated aliphatic carboxylic acid of the present invention. In this case, the contacting is preferably carried out at temperatures of between 90 and 110° C., for example, of about 100° C. The length of contacting the at least one calcium carbonate-containing mineral filler with the at least one polysiloxane is determined by the treatment temperature applied during said contacting. For example, where a treatment temperature of about 100° C. is applied, the treatment time is as short as, for example, about 5 minutes.

Said at least one polysiloxane is preferably added in a quantity such that the theoretical total weight of said at least one polysiloxane is less than 0.1 mg, more preferably less than 0.075 mg and most preferably less than 0.06 mg /m$^2$ on the surface of the treated mineral filler product.

The treated mineral filler product of the present invention may advantageously be implemented in a process of mixing and/or extruding and/or compounding and/or blow moulding with plastic materials, and preferably with PVC, polyolefins, such as polyethylene (PE), polypropylene (PP) and/or polyurethanes (PU), particularly to obtain film materials, namely stretched/oriented films, and preferably breathable film materials, or extrusion coating film materials.

In particular, film materials selected from the group comprising stretched and/or oriented films, and preferably breathable films, or extrusion coating films are characterised in that they contain said treated mineral filler product of the present invention.

In this regard, films according to the invention are characterized in that they contain treated mineral filler products of the present invention and in that they have less voids leading to uneven surfaces and improved visible uniformity. As another advantage, the mineral filler product of the present invention causes a higher output rate.

The treated mineral filler product of the present invention may also be advantageously used for flavouring products. For example, the inventive treated filler may be used to flavour diaper materials, like the breathable polyethylene cover of diapers. Furthermore, by using the inventive treated mineral filler unwanted odour may be avoided during processing, e.g. during master batch production or the film forming process in an extruder.

The following examples may additionally illustrate the invention but are not meant to restrict the invention to the exemplified embodiments. The examples below show the high volatile onset temperature and the reduced moisture pick up susceptibility of the treated mineral filler according to the present invention:

EXAMPLES

All measurement methods implemented in the examples are described here above.

Example 1

Comparative Example

Example 1 refers to the treatment of a wet ground and spray dried marble with a 1:1 mixture of stearic acid and palmitic acid at a treatment temperature of about 130° C. and the subsequent treatment with polydimethylsiloxane.

500 g of a wet ground and spray dried marble from Carrara, Italy, wet ground at 25 wt.-% in tap water in horizontal ball mill (Dynomill) and spray dried featuring a $d_{50}$ of approximately 1.6 microns and a specific surface area of 4.1 m$^2$/g and a humidity of 0.06 wt.-% was added to an MTI Mixer and the mixing was activated at 3000 rpm. Thereafter a 1:1 mixture (by weight) of dry stearic acid powder and dry palmitic acid powder at room temperature was introduced to the mixer in a quantity so as to obtain the mg of treatment agent per m$^2$ of marble indicated in Table 1, and the mixer contents were heated to 130° C. The contents of the mixer were mixed at 130° C. under a stirring speed of 3000 rpm for a period of 10 minutes. Thereafter polydimethylsiloxane (Dow Corning 200 Fluid 1000 CS) was introduced to the mixer in a quantity so as to obtain the mg of treatment agent per m$^2$ of marble indicated in Table 1. The contents of the mixer were mixed at 100° C. under a stirring speed of 3000 rpm for a second period of 5 minutes.

The product thus obtained was thereafter analysed; the results are presented in Table 1.

Example 2

Example of the invention

Example 2 refers to the treatment of a wet ground and spray dried marble with octanoic acid at a treatment temperature of about 100° C.

500 g of a wet ground and spray dried marble from Carrara, Italy, wet ground at 25 wt.-% in tap water in horizontal ball mill (Dynomill) and spray dried featuring a $d_{50}$ of approximately 1.6 microns and a specific surface area of 4.1 m$^2$/g and a humidity of 0.06 wt.-% was added to an MTI Mixer and the mixing was activated at 3000 rpm. Thereafter octanoic acid (SIGMA-Aldrich order N°. O 3907) was introduced to the mixer in a quantity so as to obtain the mg of treatment agent per m$^2$ of marble indicated in Table 1, and the mixer contents were heated to 100° C. The contents of the mixer were mixed at 100° C. under a stirring speed of 3000 rpm for a period of 5 minutes.

The product thus obtained was thereafter analysed, the results are presented in Table 1.

Example 3

Example of the invention

Example 3 refers to the treatment of a wet ground and spray dried marble with nonanoic acid at a treatment temperature of about 100° C.

500 g of a wet ground and spray dried marble from Carrara, Italy, wet ground at 25 wt.-% in tap water in horizontal ball mill (Dynomill) and spray dried featuring a $d_{so}$ of approximately 1.6 microns and a specific surface area of 4.1 m$^2$/g and a humidity of 0.05 wt.-% was added to an MTI Mixer and the mixing was activated at 3000 rpm. Thereafter nonanoic acid (Fluka order N°. 76343) was introduced to the mixer in a quantity so as to obtain the mg of treatment agent per m$^2$ of marble indicated in Table 1, and the mixer contents were heated to 100° C. The contents of the mixer were mixed at 100° C. under a stirring speed of 3000 rpm for a period of 5 minutes.

The product thus obtained was thereafter analysed, the results are presented in Table 1.

Example 4

Example of the invention

Example 4 refers to the treatment of a wet ground and spray dried marble with hexanoic acid at a treatment temperature of about 20 to 25° C.

500 g of a wet ground and spray died marble from Carrara, Italy, wet ground at 25 wt.-% in tap water in horizontal ball mill (Dynomill) and spray dried featuring a $d_{50}$ of approximately 1.6 microns and a specific surface area of 4.1 m$^2$/g and a humidity of 0.06 wt.-% was added to an MTI Mixer and the mixing was activated at 3000 rpm. Thereafter hexanoic acid (SIGMA-Aldrich order N°. 153745) was introduced to the mixer in a quantity so as to obtain the mg of treatment agent per m$^2$ of marble indicated in Table 1, and the mixer contents was hold at 20-25° C. The contents of the mixer were mixed at 20-25° C. under a stirring speed of 3000 rpm for a period of 15 minutes.

The product thus obtained was thereafter analysed; the results are presented in Table 1.

Example 5

Example of the invention

Example 5 refers to the treatment of a wet ground and spray dried marble with octanoic acid at a treatment temperature of about 100° C. and the subsequent treatment with polydimethylsiloxane.

500 g of a wet ground and spray died marble from Carrara, Italy, wet ground at 25 wt.-% in tap water in horizontal ball mill (Dynomill) and spray dried featuring a $d_{50}$ of approximately 1.6 microns and a specific surface area of 4.1 m$^2$/g and a humidity of 0.06 wt.-% was added to an MTI Mixer and the mixing was activated at 3000 rpm. Thereafter octanoic acid (SIGMA-Aldrich order N°. 03907) was introduced to the mixer in a quantity so as to obtain the mg of treatment agent per m$^2$ of marble indicated in Table 1, and the mixer contents was activated at 100° C. for 5 minutes. The contents of the mixer were mixed at 100° C. under a stirring speed of 3000 rpm for a period of 5 minutes. Thereafter polydimethylsiloxane (Dow Corning 200 Fluid 1000 CS) was introduced to the mixer in a quantity so as to obtain the mg of treatment agent per m$^2$ of marble indicated in Table 1. The contents of the mixer were mixed at 100° C. under a stirring speed of 3000 rpm for a second period of 5 minutes.

The product thus obtained was thereafter analysed; the results are presented in Table 1.

Examples 6 to 8

Examples of the invention

Examples 6 to 8 refer to the treatment of a wet ground and spray dried marble with octanoic acid at a treatment temperature of about 120° C. using different amounts of treatment agent.

For each example, 500 g of a wet ground and spray dried marble from Carrara, Italy, wet ground at 25 wt.-% in tap water in horizontal ball mill (Dynomill) and spray dried featuring a $d_{50}$ of approximately 1.6 microns and a specific surface area of 4.1 m$^2$/g and a humidity of 0.06 wt.-% was added to an MTI Mixer and the mixing was activated at 3000 rpm. Thereafter octanoic acid (SIGMA-Aldrich order N°. O 3907) was introduced to the mixer in a quantity so as to obtain the number of molecules of the respective treatment agent per m$^2$ of marble indicated in Table 2, and the mixer contents were heated to 120° C. The contents of the mixer were mixed at 120° C. under a stirring speed of 3000 rpm for a period of 10 minutes.

The products thus obtained was thereafter analysed, the results are presented in Table 2.

Example 9

Application in breathable film

A compound consisting of 50 wt.-% of the product obtained in Example 2, 45 wt.-% of a linear low density polyethylene (featuring a melt flow index (MFI) of 6, according to a measurement made at 190° C. using 2.16 kg of this polyethylene) and 5 wt.-% of a low density polyethylene (featuring a MFI of 2 according to a measurement made at 190° C. using 2.16 kg of this polyethylene) was formed in a Buss co-kneader. The compound thus obtained was then transformed into a film using a Collin Castfilm lab line, equipped with a single screw extruder having a diameter of 30 mm and a die length of 250 mm. In front of the die, a GKD (Gebr. Kufferath AG of Duren, Germany under Article number 12105170051) bordered filter package having a diameter of 30 mm, formed of filter meshes placed one against another, each featuring a given filter mesh size, namely (in the order encountered by the incoming compound) of 630 microns, 250 microns, 120 microns, 42 microns, and 120 microns, was inserted.

The produced breathable films were characterised by measuring the water vapour transmission rate (WVTR) and the water column. WVTR was measured using the Lyssy L80-5000 Water Vapour Permeability Tester at a temperature of 38° C.

Water column was measured using the Textest FX3000 Hydrostatic Head Tester. The test area of the sample was 10 cm$^2$ having a film thickness of 15 μm and the pressure increase (gradient) was set at 60 mbar/min.

Test results are given in table 3 below.

Example 10

Sensoric Test

The "sensoric test" was carried out in order to determine whether unwanted odour development can be observed for the coated calcium carbonate material.

According to the present "sensoric test", the material to be evaluated is conditioned for a period of 1 hours in the presence of water at a temperature of 80° C. More precisely, 5 ml demineralized water were added to 10 g of the respective sample in a glass vial. The vial was sealed and, after the mentioned 1 hour at 80° C., the odour of the corresponding sample was evaluated by four test persons.

Three samples A, B and C were evaluated with respect to the sensoric properties. All samples are coated $CaCO_3$ particles, wherein two identical inventive samples (sample A and C) were obtained by coating with octanoic acid (C8) and correspond to the calcium carbonate according to example 2 (test 2). One comparative sample (sample B) was obtained by coating with stearic acid (C18) and corresponds to example 1.

The four test persons did not know which of the three samples of A, B and C were identical and which was different. The test persons were asked to identify which 2 samples were identical and which was different. In a second step, the test persons described the sensoric properties or the odour of the respective samples. The results of the tests are shown in table 4 below.

All testers identified clearly the two identical samples A and C. Furthermore, it was found that the inventive samples A and C provided significantly better sensoric properties than the corresponding sample B, containing the C18 surface treated product of Example 1 and did not show any unwanted odour development.

TABLE 1

| | Test | | | | |
|---|---|---|---|---|---|
| | 1 Comparative | 2 Invention | 3 Invention | 4 Invention | 5 Invention |
| Mineral | Wet ground and spray dried GCC | Wet ground and spray dried GCC | Wet ground and spray dried GCC | Wet ground and spray dried GCC | Wet ground and spray dried GCC |
| BET | 4.1 $m^2/g$ | 4.1 $m^2/g$ | 4.1 $m^2/g$ | 4.1 $m^2/g$ | 4.1 $m^2/g$ |
| Treatment agent 1 Fatty acid | C16/C18 linear | C8 linear | C9 linear | C6 linear | C8 linear |
| Treatment agent 2 | siloxane | | | | siloxane |
| Treatment agent 1 Fatty acid | 2.6 $mg/m^2$ | 2.4 $mg/m^2$ of mineral | 2.4 $mg/m^2$ of mineral | 2.4 $mg/m^2$ of mineral | 2.4 $mg/m^2$ |
| Treatment agent 2 siloxane | 0.05 mg/m2 of mineral | | | | 0.049 $mg/m^2$ of mineral |
| Number of molecules of treatment agent 1 Fatty acid | $5.78 \times 10^{18}/m^2$ of mineral | $1.00 \times 10^{19}/m^2$ of mineral | $9.13 \times 10^{18}/m^2$ of mineral | $1.24 \times 10^{19}/m^2$ of mineral | $1.00 \times 10^{19}/m^2$ of mineral |
| Treatment temp. | 130° C. | 100° C. | 100° C. | 20-25° C. | 100° C./100° C. |
| Treatment time in min. | 10/5 | 5 | 5 | 15 | 5/5 |
| Moisture content in ppm | 700 | 594 | 414 | 551 | 516 |
| Volatile onset temperature | 245° C. | 294° C. | 296° C. | 286 | 290 |
| Water pick up (mg/g) 23° C., 50% rel. humidity exposure time 48 hours | 0.31 mg/g | 0.35 mg/g | 0.27 mg/g | 0.18 mg/g | 0.30 mg/g |
| Hydrophobic in $H_2O$/methanol (v/v) | 40/60 | 40/60 | 40/60 | 40/60 | 40/60 |

TABLE 2

| | Test | | |
|---|---|---|---|
| | 6 Invention | 7 Invention | 8 Invention |
| Mineral | Wet ground and spray dried GCC | Wet ground and spray dried GCC | Wet ground and spray dried GCC |
| BET | 4.1 $m^2/g$ | 4.1 $m^2/g$ | 4.1 $m^2/g$ |
| Treatment agent Fatty acid | C8 linear | C8 linear | C8 linear |
| Number of molecules of treatment agent 1 Fatty acid | $1.02 \times 10^{19}/m^2$ of mineral | $8.15 \times 10^{18}/m^2$ of mineral | $4.07 \times 10^{18}/m^2$ of mineral |
| Treatment temp. | 120° C. | 120° C. | 120° C. |
| Treatment time in min. | 10 | 10 | 10 |
| Volatile onset temperature | 295 | 298 | 312 |
| Water pick up (mg/g) at 23° C., 50% rel. humidity, exposure time 48 hours | 0.31 mg/g | 0.28 mg/g | 0.38 mg/g |
| Hydrophobic in $H_2O$/methanol (v/v) | 40/60 | 40/60 | 40/60 |

TABLE 3

| Breathable film prepared with material from Film properties (film thickness: 15 μm) | | Test 1 (Comparative) | Test 2 (Invention) |
|---|---|---|---|
| WVTR Lyssy | $g/m^2 \times$ day | 4250 | 4400 |
| Water column 60 mbar/min $A = 10\ cm^2$ | mbar | 250 ± 10 | 277 ± 10 |

TABLE 4

|  | sample A | sample B | sample C |
| --- | --- | --- | --- |
| test person 1 (male) | neutral, fresh | intensely | neutral |
| test person 2 (female) | pleasing sweetish | sourish, rancid, unpleasant | pleasing sweetish |
| test person 3 (male) | pleasing sweetish | slightly sourish | pleasing sweetish |
| test person 4 (male) | sweetish | sourish | sweetish |

The invention claimed is:

1. A process for preparing a treated mineral filler product, the process comprising the steps of:
   (a) providing at least one calcium carbonate-containing mineral filler, wherein the calcium carbonate-containing mineral matter is a dry ground mineral filler or a wet ground mineral filler that has been dried and has a total surface moisture level of below 1.0 mg/g if exposed to an atmosphere of 50% of relative humidity for 48 hours at a temperature of 23° C.;
   (b) providing a first treatment agent consisting of at least one saturated aliphatic carboxylic acid having from 6 to 9 carbon atoms;
   (c) contacting the at least one calcium carbonate-containing mineral filler of step (a), in one or more steps, with the first treatment agent of step (b), such that the added amount of the at least one saturated aliphatic carboxylic acid corresponds to a theoretical total number of molecules of between $1 \times 10^{18}$ and $1 \times 10^{20}/m^2$ on the surface of the calcium carbonate-containing mineral filler, and at a temperature such that the at least one saturated aliphatic carboxylic acid is in a liquid or molten state; and
   (d) mixing the at least one calcium carbonate-containing mineral filler and the at least one saturated aliphatic carboxylic acid from step (c) to form a treatment layer comprising the at least one saturated aliphatic carboxylic acid and/or reaction products of the at least one saturated aliphatic carboxylic acid on the surface of the at least one calcium carbonate-containing mineral filler, and to obtain a treated mineral filler product having a volatile onset temperature of at least 260° C. and a total surface moisture level of below 1.0 mg/g if exposed to an atmosphere of 50% of relative humidity for 48 hours at a temperature of 23° C.

2. The process according to claim 1, wherein the at least one calcium carbonate-containing mineral filler of step (a) is contacted with the first treatment agent of step (b) such that the added amount of the at least one saturated aliphatic carboxylic acid corresponds to a theoretical total number of molecules of between $5 \times 10^{18}$ and $5 \times 10^{19}/m^2$ on the surface of the calcium carbonate-containing mineral filler so treated.

3. The process according to claim 1, wherein the at least one saturated aliphatic carboxylic acid of step (b) features an equivalent isolated viscosity of less than 500 mPa·s at 23° C. when measured in a DV III Ultra model Brookfield viscometer equipped with the disc spindle 3 at a rotation speed of 100 rpm and room temperature (23±1° C.).

4. The process according to claim 1, wherein the at least one calcium carbonate-containing mineral filler of step (a) is precipitated calcium carbonate (PCC) and/or natural ground calcium carbonate (GCC).

5. The process according to claim 1, wherein the at least one calcium carbonate-containing mineral filler of step (a) is precipitated calcium carbonate (PCC) having one or more of aragonitic, vateritic and calcitic mineralogical crystal forms.

6. The process according to claim 1, wherein the at least one calcium carbonate-containing mineral filler of step (a) is natural ground calcium carbonate (GCC) obtained from marble, limestone, or chalk.

7. The process according to claim 1, wherein the at least one calcium carbonate-containing mineral filler of step (a) comprises dolomite.

8. The process according to claim 1, wherein the at least one saturated aliphatic carboxylic acid of step (b) is selected from the group consisting of hexanoic acid, heptanoic acid, octanoic acid, nonanoic acid and isonanoic acid.

9. The process according to claim 1, wherein the at least one saturated aliphatic carboxylic acid of step (b) is octanoic acid.

10. The process according to claim 1, wherein the at least one saturated aliphatic carboxylic acid of step (b) is nonanoic acid.

11. The process according to claim 1, wherein the at least one saturated aliphatic carboxylic acid of step (b) is hexanoic acid.

12. The process according to claim 1, wherein the at least one saturated aliphatic carboxylic acid of step (b) comprises octanoic acid and nonanoic acid.

13. The process according to claim 1, wherein the at least one calcium carbonate-containing mineral filler of step (a) has a median particle size diameter $d_{50}$ in the range between 0.3 μm and 10 μm.

14. The process according to claim 1, wherein the at least one calcium carbonate-containing mineral filler of step (a) has a median particle size diameter $d_{50}$ in the range between 0.5 μm and 5 μm.

15. The process according to claim 1, wherein the at least one calcium carbonate-containing mineral filler of step (a) has a median particle size diameter $d_{50}$ in the range between 1 μm and 3 μm.

16. The process according to claim 1, wherein the at least one calcium carbonate-containing mineral filler of step (a) has a median particle size diameter $d_{50}$ in the range between 1.5 μm and 1.8 μm.

17. The process according to claim 1, wherein the at least one calcium carbonate-containing mineral filler of step (a) has a specific surface area (BET) of between 1 $m^2/g$ and 10 $m^2/g$ as measured by the BET nitrogen method.

18. The process according to claim 1, wherein the at least one calcium carbonate-containing mineral filler of step (a) has a specific surface area (BET) of between 3 $m^2/g$ and 8 $m^2/g$ as measured by the BET nitrogen method.

19. The process according to claim 1, wherein the treated mineral filler product obtained in step (d) has a volatile onset temperature of greater than or equal to 270° C.

20. The process according to claim 1, wherein the treated mineral filler product obtained in step (d) has a volatile onset temperature of between 270° C. and 350° C.

21. The process according to claim 1, wherein the treated mineral filler product obtained in step (d) has a higher volatile onset temperature than the same mineral filler having a treatment layer in which the at least one saturated aliphatic carboxylic acid is replaced with an aliphatic carboxylic acid and/or aliphatic carboxylic acid salt having 10 to 24 carbon atoms.

22. The process according to claim 1, wherein the treated mineral filler product obtained in step (d) has a total surface moisture level of below 0.5 mg/g if exposed to an atmosphere of 50% of relative humidity for 48 hours at a temperature of 23° C.

23. The process according to claim 1, wherein the treated mineral filler product obtained in step (d) has a total surface moisture level of below 0.4 mg/g if exposed to an atmosphere of 50% of relative humidity for 48 hours at a temperature of 23° C.

24. The process according to claim 1, wherein the treatment layer of step (d) comprises at least 95 wt. %, based on the total weight of the treatment layer, of at least one saturated aliphatic carboxylic acid having from 6 to 9 carbon atoms and/or reaction products of the at least one saturated aliphatic carboxylic acid on the surface of the at least one mineral filler.

25. The process according to claim 1, wherein the treatment layer in step (d) comprises at least 99 wt. %, based on the total weight of the treatment layer, of at least one saturated aliphatic carboxylic acid having from 6 to 9 carbon atoms and/or reaction products of the at least one saturated aliphatic carboxylic acid on the surface of the at least one mineral filler.

26. The process according to claim 1, wherein the treatment layer of step (d) is subjected to additional processing so that at least one or more additional treatment layers are located on the treatment layer of step (d).

27. The process according to claim 26, wherein the least one or more additional treatment layers comprises at least one polysiloxane.

28. The process according to claim 26, wherein the least one or more additional treatment layers comprises polydimethylsiloxane.

29. The process according to claim 26, wherein the at least one saturated aliphatic carboxylic acid is octanoic acid, and the at least one or more additional treatment layers comprises polydimethylsiloxane.

* * * * *